US007316111B2

(12) United States Patent
Krieger

(10) Patent No.: US 7,316,111 B2
(45) Date of Patent: Jan. 8, 2008

(54) MULTI-PURPOSE HYDRAULIC SYSTEM

(75) Inventor: Daniel J. Krieger, Bismarck, ND (US)

(73) Assignee: Clark Equipment Company, Montvale, NJ (US)

( * ) Notice: Subject to any disclaimer, the term of this patent is extended or adjusted under 35 U.S.C. 154(b) by 0 days.

(21) Appl. No.: 11/331,495

(22) Filed: Jan. 13, 2006

(65) Prior Publication Data

US 2007/0163252 A1 Jul. 19, 2007

(51) Int. Cl.
*F16D 31/02* (2006.01)

(52) U.S. Cl. ............................ 60/421; 60/422; 60/486

(58) Field of Classification Search .................. 60/421, 60/422, 428, 429, 430, 486
See application file for complete search history.

(56) References Cited

U.S. PATENT DOCUMENTS

| | | | | |
|---|---|---|---|---|
| 3,916,624 | A | 11/1975 | Machens et al. | 60/394 |
| 3,916,767 | A | 11/1975 | Barton | 91/412 |
| 3,962,870 | A | 6/1976 | Lech | 60/428 |
| 4,199,293 | A | 4/1980 | Peterson | 414/699 |
| 6,029,445 | A | 2/2000 | Lech | 60/422 |
| 6,357,231 | B1 | 3/2002 | Duppong | 60/421 |
| 6,618,659 | B1 | 9/2003 | Berger et al. | 701/50 |
| 6,708,490 | B2 * | 3/2004 | Toji et al. | 60/421 |

* cited by examiner

*Primary Examiner*—Michael Leslie
(74) *Attorney, Agent, or Firm*—Michael Best & Friedrich LLP

(57) ABSTRACT

A hydraulic system including a first pump, a second pump, an auxiliary passage, and a supplemental apparatus. The first pump is in fluid communication with a first valve, and the second pump is in fluid communication with a second valve. The auxiliary passage is in fluid communication with the first valve and the second valve. The supplemental apparatus is in fluid communication, by way of a supplemental passage, with the second valve and the auxiliary passage.

14 Claims, 5 Drawing Sheets

MULTI-PURPOSE HYDRAULIC SYSTEM

BACKGROUND OF THE INVENTION

The present invention relates to a multi-purpose hydraulic system. Many hydraulic circuit systems use dual parallel valves. A dual parallel valve system uses two pumps in a parallel valve arrangement. Pump flows are directed to primary hydraulic circuits and then merged into an auxiliary circuit. While such a dual parallel valve system is useful for many applications, an increasing desire for greater flexibility has also been felt.

SUMMARY OF THE INVENTION

Various embodiments are disclosed that provide a flexible, advantageous multi-purpose valve system. Embodiments of the present invention provide a variety of different advantageous flow options to an auxiliary passage and an auxiliary valve connected thereto, among other advantageous purposes. Embodiments of the present invention are useful in a variety of applications, including in a power machine of a type useful for utility, industrial, commercial, logistical, and agricultural purposes, for example.

The present invention includes one illustrative embodiment that relates to a hydraulic system. The hydraulic system includes a first pump, a second pump, an auxiliary passage, and a supplemental apparatus. The first pump is in fluid communication with a first valve, and the second pump is in fluid communication with a second valve. The auxiliary passage is in fluid communication with the first valve and the second valve. The supplemental apparatus is in fluid communication, by way of a supplemental passage, with the second valve and the auxiliary passage. The supplementary apparatus can take a wide variety of forms, variously including a dump valve, an additional pump, a relief valve, and other components, and thereby reconfigure the hydraulic circuit to provide a greater and more flexible variety of flow rates and pressures that can be applied to the auxiliary passage. The auxiliary passage may be in fluid communication with a third valve.

Another illustrative embodiment of the present invention relates to a hydraulic system that includes a first pump, a second pump, an auxiliary passage, a check valve, and a means for modifying flow to the auxiliary passage. The first pump is in fluid communication with a first valve, and the second pump is in fluid communication with a second valve. The auxiliary passage is in downstream fluid communication with the first valve and the second valve. The check valve is in fluid communication between the second pump and the auxiliary passage.

Another illustrative embodiment of the present invention relates to a power machine. The power machine includes a frame, a plurality of ground engaging members such as tracks or wheels supporting the frame, and an engine operably connected to the ground engaging members. The power machine also includes a first pump, a second pump, an auxiliary valve, and an apparatus for providing various flow options to the auxiliary valve. The first pump is connected to the engine, and in fluid communication via a first passage with a first valve and a third valve. The first valve controls flow to a boom that is mounted on the frame. The second pump is also connected to the engine, and in fluid communication via a second passage with a second valve and a third valve. The second valve controls flow to an arm mounted on the boom, and the third valve controls flow to an attachment mounted on the power machine. The auxiliary valve is in fluid communication via an auxiliary passage with the first passage, downstream of the first valve, and with the second passage, downstream of the second valve. The apparatus for providing various flow options to the auxiliary passage is in fluid communication with the second passage downstream of the first valve and the second valve, and upstream of the auxiliary passage and third valve.

The embodiments detailed herein are illustrative of a broad range of embodiments comprised within the scope of the claims. They successfully provide the greater flexibility that has been desired by those skilled in the art, although they also provide a wealth of additional inventive and surprising advantages, not limited to solutions of previously perceived problems. A wide variety of such embodiments, applications, and advantages of the present invention will be apparent to those skilled in the art from the present disclosure.

DETAILED DESCRIPTION OF ILLUSTRATIVE EMBODIMENTS

A variety of embodiments that serve as illustrative examples are described in detail as follows. They are representative examples from among a great variety of additional embodiments that are contemplated, and do not serve to set any limits or bounds on the potential variety of embodiments. Any combination or permutation of the elements described is also contemplated within the scope of the inventive embodiments. Likewise, any of the components disclosed herein may be replaced by alternative or substitute components performing a substantially similar function, as currently or hereafter understood by those skilled in the art, and remain within the contemplated embodiments comprised within the present inventive scope.

Figure 1:
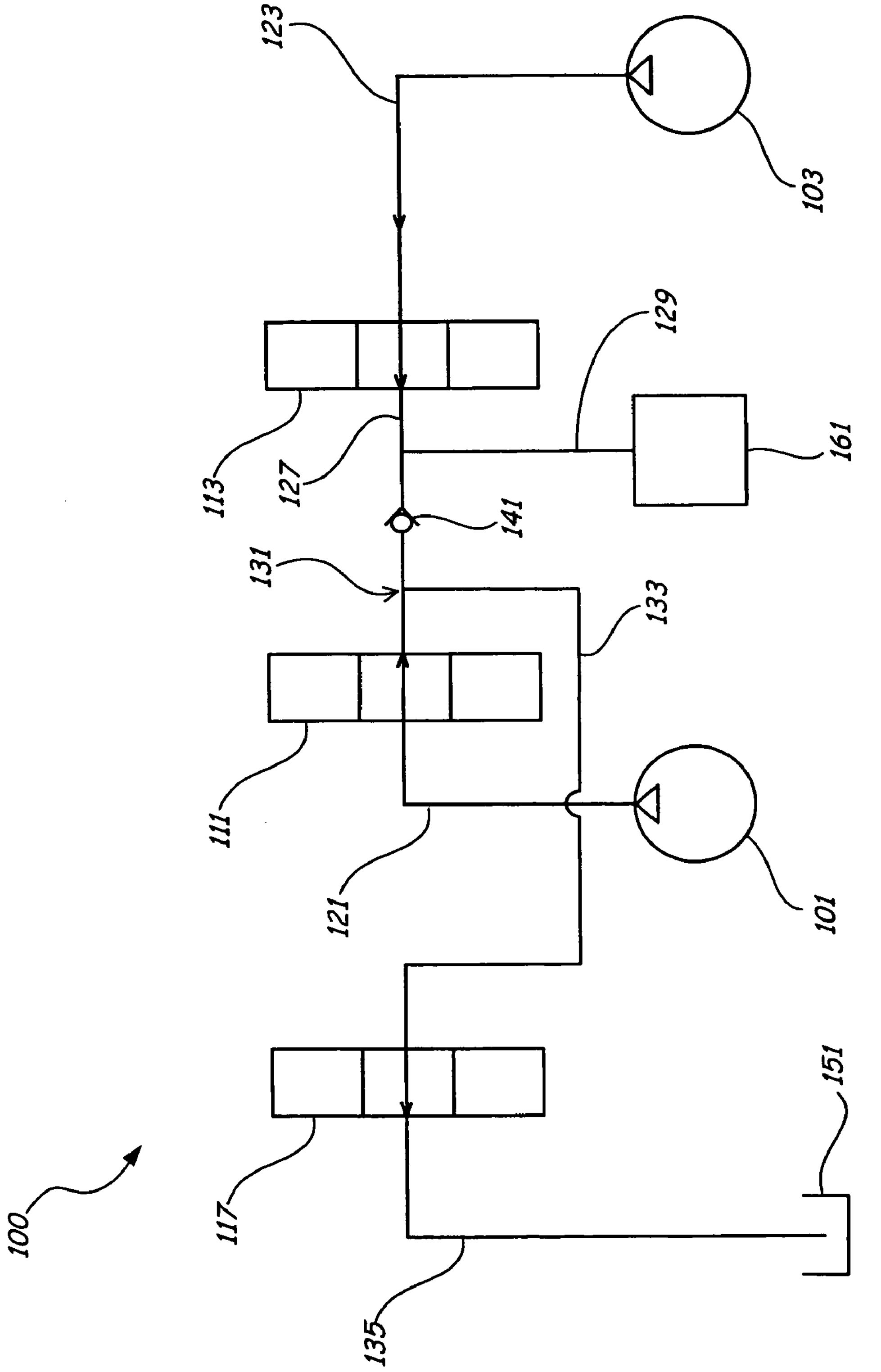
FIG. 1 schematically depicts a hydraulic circuit with a supplemental apparatus, according to one illustrative embodiment.

FIG. 1 schematically depicts a hydraulic circuit 100, according to one illustrative embodiment. Hydraulic circuit 100 displays inventive advantages, as elaborated in the following description. Hydraulic system 100 includes first pump 101, second pump 103, auxiliary passage 133, and supplemental apparatus 161. More particularly, first pump 101 is in fluid communication with a first valve 111, via fluid passage 121. Second pump 103 is in fluid communication with a second valve 113, via fluid passage 123. First pump 101 is thereby configured to provide a pressurized flow along downstream fluid passage 121 to first valve 111, and second pump 103 is thereby configured to provide a pressurized flow along downstream fluid passage 123 to second valve 113. First and second pumps 101 and 103 may be gear pumps, piston pumps, or any other type of pumps or comparable components, as currently or hereafter understood by those skilled in the art. A check valve 141 occupies second passage 127 that is downstream of second valve 113. Auxiliary passage 133 is in fluid communication with the outlet of the first valve 111 and the second valve 113, through the node 131, which is downstream of both valves 111 and 113. Auxiliary passage 133 provides fluid communication downstream of valves 111 and 113 to third valve 117. The outlet of third valve 117 is connected to tank 151 via passage 135.

First valve 111, second valve 113, and third valve 117 are illustratively depicted as open center valves, but may also be any other type of valves, as currently or hereafter understood by those skilled in the art. First valve 111, second valve 113, and third valve 117 are also illustrated in very simplified form and in neutral position, as those skilled in the art will recognize. As those skilled in the art will also recognize, while separate valves are depicted and described, other embodiments may include a single valve stack with multiple valve spools and multiple inlets as a functionally equivalent structure. In such an embodiment, the valves variously labeled, for example, valves 111, 113, and 117, may refer to different sections of a multiple spool valve stack, which will function in a way that is also in accordance with the depiction in FIG. 1 and the subsequent figures. Because the output of both pumps 101 and 103 is combined at node 131 in the flow from there to third valve 117, hydraulic circuit 100 ensures a high level of flow to third valve 117.

The embodiment of hydraulic circuit 100 in FIG. 1 may be usefully applied to a mechanical system, with each of valves 111, 113, and 117 fluidly coupled to various hydraulically activated actuators (not depicted in FIG. 1), and configured to provide pressurized flow selectively to the actuators, as is understood by those skilled in the pertinent art. For example, in one illustrative embodiment, valves 111, 113, and 117 may be open center valves in fluid communication with the actuators, which themselves may be hydraulic fluid cylinders, or hydraulic motors, mounted between separate components, capable of driving relative motion of the components, selectively as determined by an operator controlling each of valves 111, 113, 117. In one particular example of such a mechanical application, among a variety of other potential embodiments, first valve 111 may control the lift of an implement; second valve 113 may control a tilt of an interrelated implement; and third valve 117 may control an auxiliary component. An illustrative showing of this particular example is laid out in further detail below with reference to FIG. 5.

Supplemental apparatus 161 is in fluid communication via a supplemental passage 129 in fluid communication with passage 127, downstream of second valve 113, and upstream of check valve 141 and node 131. Supplemental apparatus 161 is thereby enabled to alter the characteristics of a flow passing through passage 127 and check valve 141, to auxiliary passage 133, and thereby to third valve 117. So, among the advantageous functions of supplemental apparatus 161 is the ability to modify the properties of a hydraulic flow to third valve 117, to provide a flexible set of flow options for third valve 117. The variety of these flow options is multiplied by the many different particular components that may be included in supplementary apparatus 161, as is further elaborated below.

Figure 2:
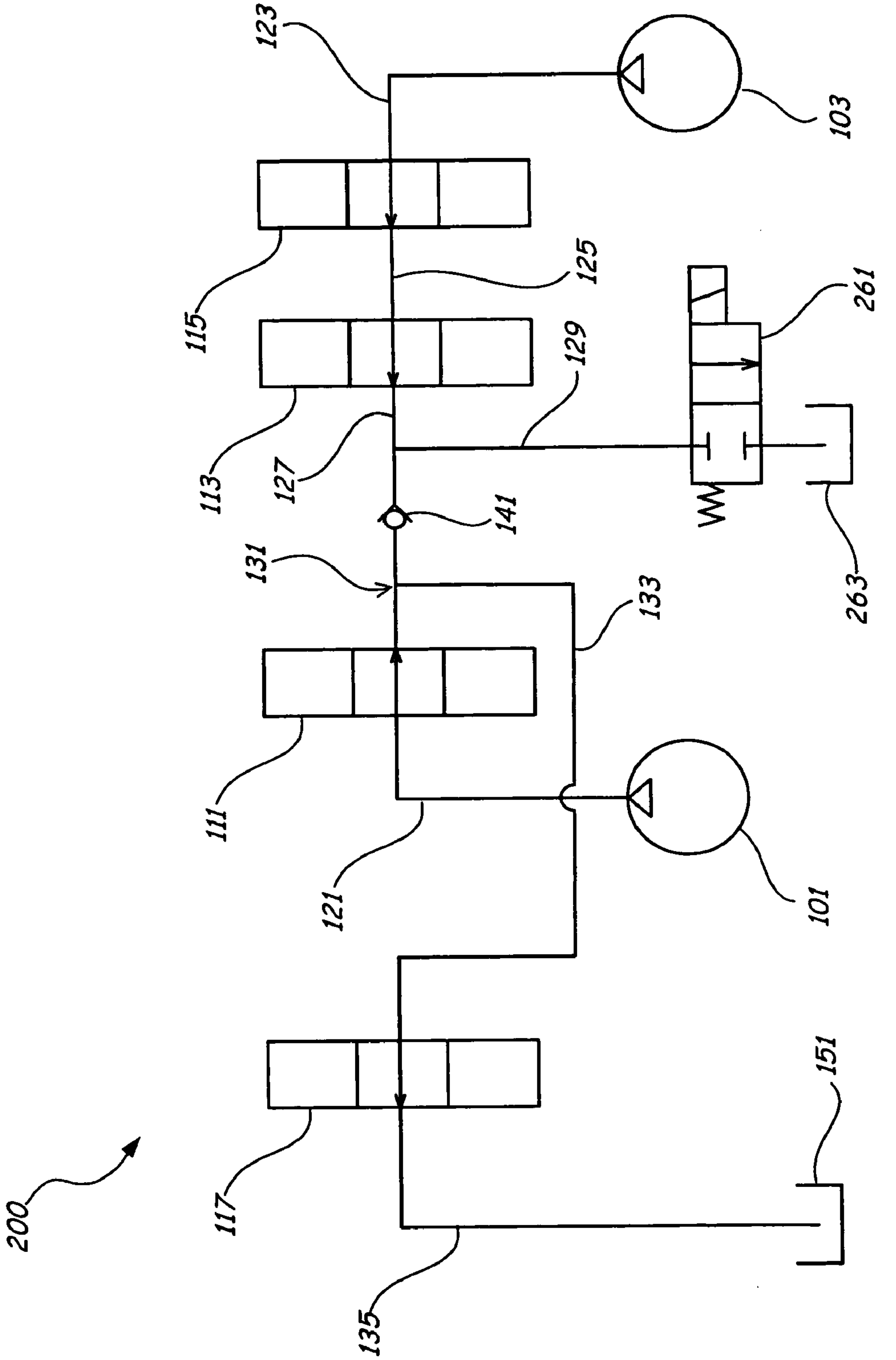
FIG. 2 schematically depicts a hydraulic circuit that includes a supplemental dump valve, according to another illustrative embodiment.

FIG. 2 schematically depicts a hydraulic circuit 200 with a supplemental dump valve 261, according to another illustrative embodiment. The structure of hydraulic circuit 200 is similar in some respects to that of hydraulic circuit 100 of FIG. 1, as indicated by several mutually common reference labels applied to the similar elements across the two embodiments. In the case of hydraulic circuit 200, the supplemental passage 129 leads to a particular supplemental apparatus, which includes a dump valve 261, along with an additional connection to tank 263. These particular examples corresponding to supplemental apparatus 161 of FIG. 1 contribute to the flexible variety of auxiliary flow options, as further elaborated below.

It should also be noted that hydraulic circuit 200 further includes a fourth valve 115, on the fluid passage leading downstream from second pump 103, upstream of second valve 113, and in fluid communication therewith via fluid passage portion 125. For instance, referring again to the particular embodiment mentioned above, in which valve 111 controls the lift of an implement, valve 113 controls the tilt of an interrelated implement, and third valve 117 controls an auxiliary component, fourth valve 115 may usefully be applied to control still another component mounted to a power machine, which might be referred to as a box component, such as is explained below with reference to FIG. 5. Additional fourth valve 115 contributes to illustrating another sample from among the great variety of hydraulic arrangements possible within various embodiments contemplated herewith.

Returning to supplemental dump valve 261, this feature provides added flow options communicated to third valve 117 via passage 133. As a particular example, supplemental dump valve 261 may allow for a selective reduction in the flow to the third valve 117. An operator in control of the valves of hydraulic circuit 200 may selectively open supplemental dump valve 261, thereby allowing some or all of the flow along fluid passage 127, sourced from second pump 103, to be diverted down supplemental passage 129. This flow is then allowed to pass through the opened supplemental dump valve 261 to empty into supplemental tank 263, rather than to flow through check valve 141 and node 131 to contribute to the flow down passage 133. Instead, the auxiliary flow through passage 133 then remains steadily fed by the flow from first pump 101 via passage 121, but receives a diminished flow contribution, or no flow contribution, sourced from second pump 103 via passage 127. This effect thereby selectively reduces the flow to third valve 117.

Supplementary dump valve 261 thereby provides an illustrative means for modifying flow to the auxiliary passage 133. In particular, supplementary dump valve 261 thereby provides a means for reducing flow, and providing either a normal flow or a reduced flow, to the auxiliary passage 133, and thereby to third valve 117. This option also then raises the potential for the hydraulic circuit 200 to be provided with larger displacement pumps 101 and 103, to achieve a higher standard auxiliary flow rate, which could then be lowered when desired to an auxiliary flow rate that is similar to the maximum flow rate under the prior circuit, but that is a reduced flow rate according to the new circuit, which thereby retains the capacity for both the desired lower flow rate as well as a higher flow rate. So, depending on whether the standard flow rate is also adjusted along with the addition of a supplementary dump valve 261, the particular supplementary apparatus of hydraulic circuit 200 allows for a range of optional auxiliary flow rates that may extend lower, or higher, or both lower and higher than the standard auxiliary flow rate of which an otherwise comparable hydraulic circuit lacking in such a supplemental apparatus would be capable.

Figure 3:
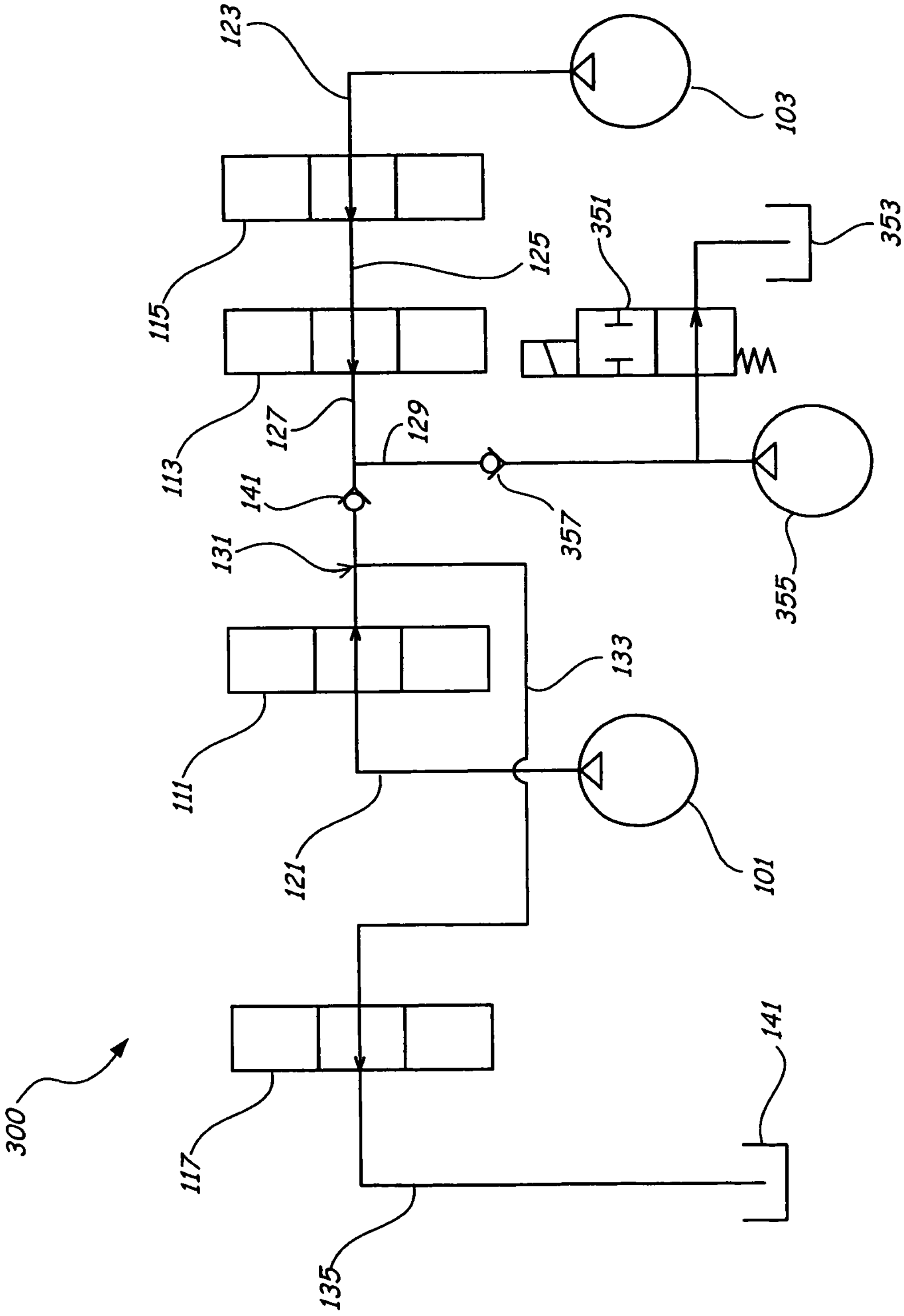
FIG. 3 schematically depicts a hydraulic circuit that includes a supplemental dump valve and a supplemental pump, according to another illustrative embodiment.

FIG. 3 schematically depicts a hydraulic circuit 300 according to another illustrative embodiment. In particular, the supplemental apparatus of hydraulic circuit 300 includes not only a supplemental dump valve 351, and a supplemental tank 353 in fluid communication with the dump valve 351, but also a supplemental pump 355 in fluid communication with the dump valve 351, and a supplemental check valve 357 on the supplemental passage 129, between the dump valve 351 and the auxiliary passage 133.

It can be seen that while supplemental dump valve 251 of hydraulic circuit 200 is depicted to be biased in the closed position, supplemental dump valve 351 is depicted to be biased in the open position. This is intended to contribute to illustrating a very different function of hydraulic circuit 300 compared to hydraulic circuit 200. When supplemental dump valve 251 in hydraulic circuit 200 is in the closed position, which might be selected as a default position in one illustrative embodiment, the flow from second pump 103 passes undiverted through second valve 113 onward through check valve 141 to auxiliary passage 133 and third valve 117. Similarly, in hydraulic circuit 300, the flow from second pump 103 passes undiverted through second valve 113 onward through check valve 141 to auxiliary passage 133 and third valve 117, and is blocked from passing to the remaining supplemental apparatus 351, 353, 355 due to the presence of check valve 357 on supplemental passage 129. On the other hand, check valve 357 does allow flow from supplemental pump 355 into passages 129 & 127 and onward through check valve 141, node 131, and auxiliary passage 133, to third valve 117.

The supplemental flow from pump 355 may be selectively directed to passages 129 & 127, to combine with the flow from second pump 103, under circumstances that can be controlled using supplemental dump valve 351. When dump valve 351 is in the open position, as indicated in FIG. 3, flow from supplemental pump 355 may pass through dump valve 351 to be cycled back into supplemental tank 353. On the other hand, when supplemental dump valve 351 is partially or fully closed, while supplemental pump 355 is operating, then either some or all of flow from pump 355 will be routed through check valve 357 to passage 127 and on to auxiliary passage 133 and third valve 117. In this manner, the supplemental apparatus 351, 353, 355, 357 of hydraulic circuit 300 provides additional modes of flexibly modifying the flow characteristics, and in particular the flow rate, to auxiliary passage 133 and third valve 117.

By this mechanism, hydraulic circuit 300, analogously in some respects to hydraulic circuit 200, uses supplemental apparatus 351, 353, 355, 357 to provide a variety of different flow rates to auxiliary passage 133 and third valve 117. When this supplementary apparatus is potentially paired with a corresponding selection of alternative first and second pumps 101, 103, the supplementary apparatus 351, 353, 355, 357 makes possible rates of flow that may be lower, higher, or both lower and higher than what would be possible in an otherwise comparable hydraulic circuit without such supplemental apparatus.

For example, even without altered capacities for first and second pumps 101, 103, the hydraulic circuit 300 may be configured with supplementary dump valve 351 closed as a default, with an option of selectively and variably opening it, in one illustrative embodiment. This would provide hydraulic circuit 300 with a default mode of providing supplementary flow from supplementary pump 355 to auxiliary passage 133 and third valve 117, and a corresponding default flow rate that is high relative to an otherwise comparable system without the supplementary apparatus, while that high default flow rate may selectively be modified by a user by opening supplementary dump valve 351, partially or entirely, thereby reducing the supplementary flow to third valve 117, down to a minimum rate, corresponding to the supplementary dump valve being fully opened, that is similar to the rate of a comparable circuit without the supplementary apparatus.

The supplementary apparatus of hydraulic circuit 300, including supplementary dump valve 361 and supplementary pump 355, thereby provides another illustrative means for modifying flow to the auxiliary passage 133 and the third valve 117. In particular, hydraulic circuit 300 includes supplementary pump 355 in fluid communication with auxiliary passage 133 via passages 129 & 127, and supplementary dump valve 351 in fluid communication with supplementary pump 355, wherein supplementary pump 355 and supplementary dump valve 351 provide a means for increasing flow, and providing either a normal flow or an increased flow to the auxiliary passage 133, and thereby to third valve 117.

Figure 4:
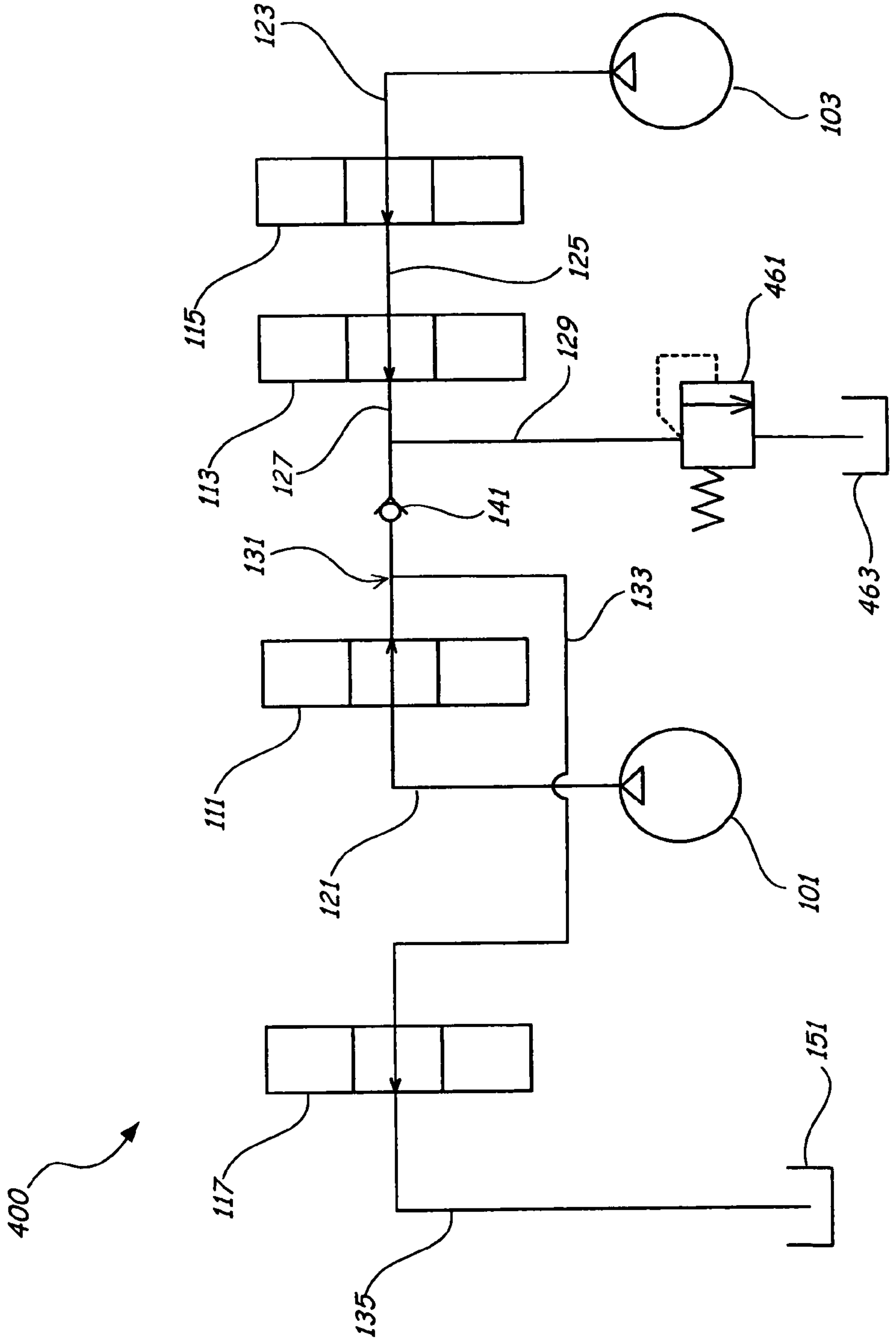
FIG. 4 schematically depicts a hydraulic circuit that includes a supplemental relief valve, according to another illustrative embodiment.

FIG. 4 schematically depicts another hydraulic circuit 400 according to yet another illustrative embodiment. In particular, hydraulic circuit 400 includes supplementary apparatus including a supplemental relief valve 461 in fluid communication with supplementary passage 129, and a tank 463 in fluid communication with the supplemental relief valve 461. The remaining components are once again labeled with identical reference labels to indicate their similarity to the components of the other embodiments, in this particular embodiment.

Relief valve 461 may be selected to have a relief pressure below the working pressure of second pump 103. In this case, the third valve 117 can be supplied with low pressure flow from both first pump 101 and second pump 103, with supplemental relief valve 461 remaining closed. Alternately, flow from second pump 103 is limited by relief valve 461, such that flow from second pump 103 will escape through supplemental passage 129 and supplemental relief valve 461 into tank 463; and flow from first pump 101 is thereby delivered alone to third valve 117, at higher pressure, but at a reduced horsepower compared to when third valve 117 is supplied with flow from both first pump 101 and second pump 103. By ensuring that the pressure being delivered by pump 103 is kept below a cap determined by the relief valve 461, by opening relief valve 461 and allowing flow through to tank 463 if that pressure cap is reached, pump 101 is able to be operated at higher pressure without exceeding the power provided by the engine, which could be the case if pump 103 were allowed also to operate at pressure above the cap set by relief valve 461. The increased pressure flow from first pump 101 is prevented from being affected by supplementary valve 461 by check valve 141 occupying passage 127 between first pump 101 and supplementary passage 129. This also still allows high pressure flow to be provided from first pump 101 to first valve 111 and high pressure flow to be provided from second pump 103 to fourth valve 115 and second valve 113.

The supplementary apparatus of hydraulic circuit 400, including supplementary relief valve 461, thereby provides yet another illustrative means for modifying flow to the auxiliary passage 133 and the third valve 117. In particular, hydraulic circuit 400 includes relief valve 461 in fluid communication with second pump 103 and check valve 141, thereby providing a means for modifying the pressure that can be provided to auxiliary passage 133 and third valve 117, and providing either a normal flow, or a reduced horsepower, high pressure flow to the auxiliary passage 133 and third valve 117.

Figure 5:
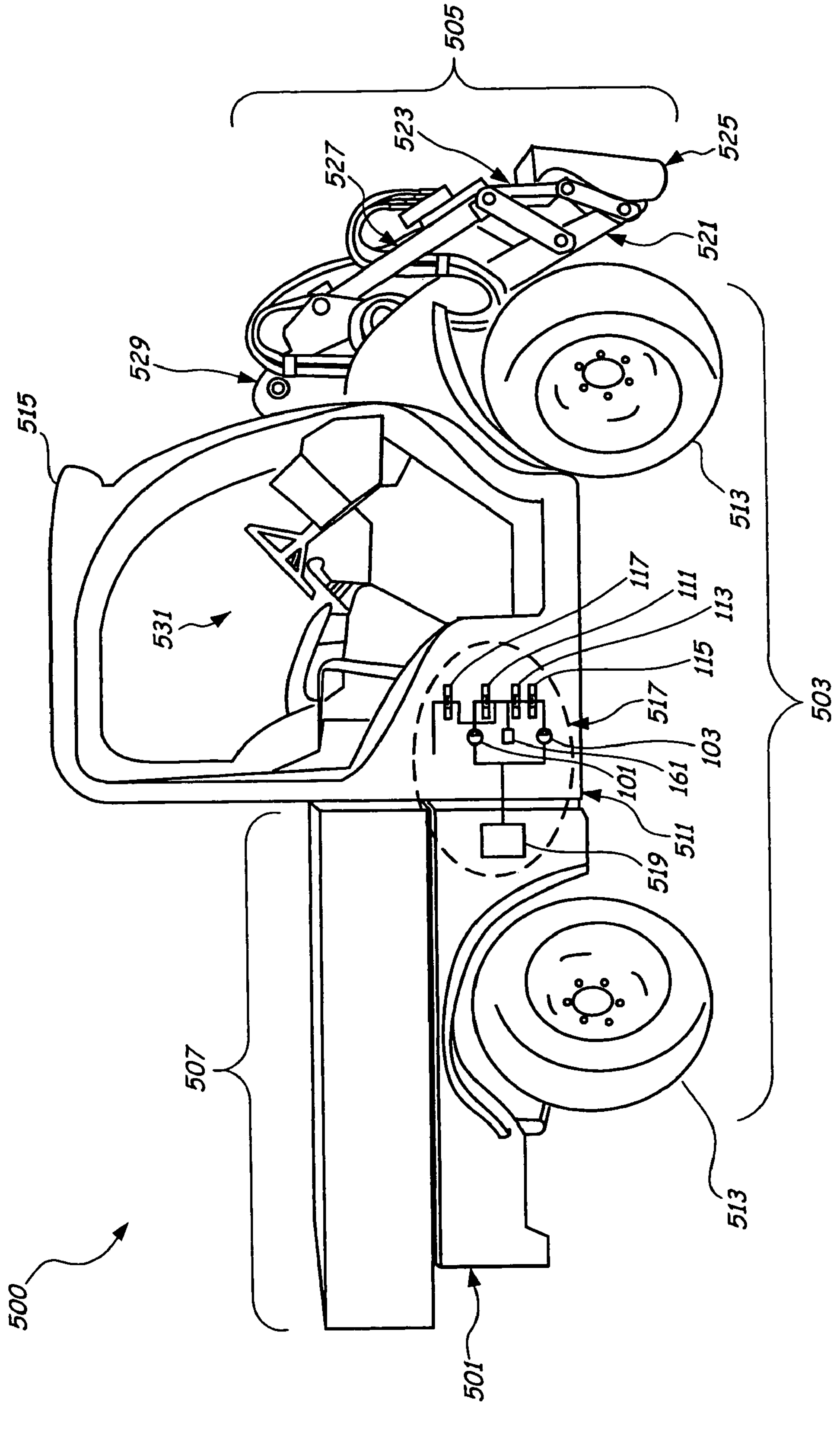
FIG. 5 depicts a side view, cutaway depiction of a hydraulic system embodied in a power machine, according to another illustrative embodiment.

FIG. 5 depicts yet another embodiment, involving an illustrative application of a hydraulic circuit embodiment as associated with a machine to which it is usefully applied. While the previous figures dealt with embodiments at the level of a hydraulic circuit, FIG. 5 deals with an integrated system embodiment, at the level of a power machine 500 incorporating a hydraulic circuit 517. FIG. 5 depicts a side view, partial cutaway depiction of a power machine 500, comprising an embodiment of a hydraulic circuit 517 as seen in a simplified depiction, according to one illustrative embodiment. The particular power machine 500 depicted in FIG. 5 is a utility work machine, although any of a variety of other machines, such as loaders, excavators, backhoes, etc. occur in other embodiments. Power machine 500 also includes frame 501, drivetrain 503, workgroup 505, and powered box 507. Drivetrain 503 includes a plurality of ground engaging members, in particular wheels 513 in this embodiment, supporting the frame 501. Wheels 513 are illustratively depicted as being coupled to a four-wheel steering system, in this embodiment. Workgroup 505 includes boom 521, tilt cylinder 527, tilt linkage 523, and attachment mounting device (or attachment plate) 525. Boom 521 is mounted on the front of frame 501 with swiveling pivot mount 529. Attachment plate 525 may have any of a number of powered attachments mounted to it and hydraulically coupled to power machine 500. These components, and some of the inventive advantages of this embodiment, are elaborated below.

Frame 501 includes operator cab 515 and power/control compartment 511, which includes hydraulic circuit 517, along with associated components such as distribution components (not individually depicted in FIG. 5) for conveying hydraulic lines from hydraulic circuit 517 to the components they are to control, in workgroup 505 and box 507. Power/control compartment 511 also includes an engine 519 (in a simplified depiction), such as a diesel engine in this embodiment, that is operably connected to and provides power to wheels 513, such as by means of a transmission, and to hydraulic pumps, such as pumps 101, 103 within hydraulic circuit 517.

Operator cab 515 is situated on top of frame 501, and is configured for an operator to sit within, and includes an operator interface 531 providing an operator with control implements for selectively operating power machine 500.

The swiveling pivot mount 529 by which workgroup 505 is mounted to frame 501 allows boom 521 to lift up or pivot down. The tilt linkage 523 pivots about a pivot joint on the end of boom 521 under the power of tilt cylinder 527, and the attachment plate 525 pivots about a pivot joint on the end of tilt linkage 523, enabling the tilt of attachment plate 525. While attachment plate 525 is illustratively depicted without an attachment mounted to it, any of a wide range of attachments may be mounted to it in other embodiments. This may include any device coupled to the workgroup to complete a prescribed task, and may include a trenching bucket, a grading bucket, a hydraulic breaker, a plate compactor, a rotator, an auger, a hammer, a ripper, an angle broom, a snow blade, a snow blower, a spreader, a stump grinder, a chipper, a spreader, or other possible attachments.

Powered box 507 is one illustrative example of a box attachment mounted on power machine 500, and is tiltably mounted with a hydraulically powered lift capability about a hinge mounting (not depicted in FIG. 5) in this illustrative embodiment. Box 507 may be used for carrying tools, construction equipment, dirt, sand, sod, hay, snow, or any other cargo, for example. Box 507 has a hydraulically powered tilt, which may assist in unloading its cargo, for example. While a box 507 is depicted in this embodiment, a wide variety of other box alternatives may be mounted to power machine 500 in other embodiments, such as sprayer tanks, sand hoppers, or other alternatives, for example, and may be mounted in a variety of configurations relative to workgroup 505, in place of or together with box 507, in various embodiments.

Hydraulic circuit 517 is similar in many respects to hydraulic circuits 100, 200, 300 and 400 as depicted in FIGS. 1, 2, 3 and 4. Hydraulic circuit 517 includes, in a configuration similar to those of FIGS. 1, 2, 3 and 4 and in a depiction that is again simplified and now on a smaller scale: first pump 101, second pump 103, valves 111, 113, 115 and 117, and supplemental apparatus 161, which is depicted in generic form to represent any potential embodiments, including those depicted in FIGS. 1-4.

Hydraulic circuit 517 also includes engine 519, depicted in simplified form. First pump 101 is operably connected to engine 519, and is in fluid communication via a first passage with first valve 111, which, illustratively in this embodiment, controls the boom 521. Second pump 113 is also operably connected to engine 519, and is in fluid communication via a second passage with fourth valve 115 and second valve 113. The second valve 113 illustratively controls tilt linkage 523 operably mounted on boom 521, and the fourth valve 115 illustratively controls flow to an attachment operably mounted on attachment mounting device 525 of power machine 500, in this particular embodiment. Third valve 117 is in fluid communication via an auxiliary passage with the first passage, downstream of first valve 111, and with the second passage, downstream of second valve 113 and fourth valve 115. Third valve 117 illustratively controls flow to any variety of implements or other attachments that may be mounted on power machine 500. Each of valves 111, 113, 115 and 117 may provide pressurized hydraulic flow selectively to either one of two opposing actuators in at least one corresponding pair about a joint, for controlling the motion of a respective implement about that joint. Although the example of valves 111, 113, 115 and 117 and their respective implements of power machine 500 is presented as an illustrative configuration of hydraulic circuit elements controlling a respective collection of various implements, any other arrangement of valves to implements, and any number and type of valves, including open center valves, a multiple spool valve stack, or other types of valves, and a wide variety of other actuable implements, are contemplated for inclusion in other embodiments.

The hydraulic flow from each of valves 111, 113, and 117 is routed so as to control the boom 521, tilt linkage 523, and attachments mounted on attachment mounting device 525, respectively, via tubelines and hoses through frame 501 and on the workgroup 505, while hydraulic flow from fourth valve 115 is routed to box 507 via tubelines and hoses (not separately depicted in FIG. 5) through frame 501. Auxiliary hydraulic flow rates and pressures are a key determinant of the capacity of attachments mounted on attachment mounting device 525, and its compatibility with power machine 500. Flow direction, rate, and duration are controlled by the operator, via controls that may be provided in operator cab 515, in this illustrative embodiment.

Supplementary apparatus 161 offers the user of power machine 500 a far broader range of options for flow rates, pressures, and related variables for controlling implements such as attachments mounted on attachment mounting device 525, thereby adding a far greater flexibility and range of advantages to such implements and to power machine 500 overall.

Although the present invention has been described with reference to certain illustrative embodiments, workers skilled in the art will recognize that changes may be made in form and detail without departing from the spirit and scope emanating from the inventive embodiments. As one example, while much of the above discussion makes specific mention of hydraulic flow and a hydraulic circuit, it will be readily understood by those skilled in the art that the principles and advantages described herein may be similarly applicable to a broad range of fluid systems and control circuits. As another example, while separate valves are depicted and described, other embodiments may include a single valve stack with multiple valve spools and multiple inlets as a functionally equivalent structure, as those skilled in the art will recognize. In such an embodiment, the valves variously labeled, for example, valves 111, 113, 115, and 117, may refer to different sections of a single, multiple spool valve stack. As yet another example, while the illustrative embodiment of a power vehicle is used to point out examples of advantageous application of specific embodiments, a wide variety of other applications, including any applications in which a hydraulic circuit or other fluid or control circuit are applicable, may also benefit from various embodiments and are contemplated within the scope of the embodiments claimed herein. Still other embodiments, applications, and advantages are also possible, none of which are excluded from the scope of the present invention.

What is claimed is:

1. A hydraulic system comprising:

a first pump, in fluid communication with a first valve;

a second pump, in fluid communication with a second valve;

an auxiliary passage, in fluid communication with the first valve and the second valve; and a supplemental apparatus, in fluid communication via a supplemental passage with the second valve and the auxiliary passage, wherein the supplemental apparatus comprises a dump valve and a supplemental check valve, wherein the supplemental check valve is on the supplemental passage between the dump valve and the auxiliary passage.

2. The hydraulic system of claim 1, wherein the supplemental apparatus further comprises a tank in fluid communication with the dump valve.

3. The hydraulic system of claim 1, wherein the supplemental apparatus further comprises a supplemental pump in fluid communication with the supplemental check valve and the dump valve.

4. The hydraulic system of claim 1, further comprising a third valve in fluid communication with the auxiliary passage.

5. A hydraulic system comprising:

a first pump, in fluid communication with a first valve;

a second pump, in fluid communication with a second valve;

an auxiliary passage, in downstream fluid communication with the first valve and the second valve;

a check valve, in fluid communication between the second pump and the auxiliary passage; and a means for modifying flow to the auxiliary passage, the means for modifying flow including means for increasing flow to the auxiliary passage.

6. The hydraulic system of claim 5, wherein the means for increasing flow to the auxiliary passage comprises a supplemental pump, in fluid communication with the auxiliary passage.

7. The hydraulic system of claim 6, wherein the means for increasing flow to the auxiliary passage further comprises a dump valve in fluid communication with the supplemental pump.

8. A power machine comprising:

a frame;

a plurality of ground engaging members supporting the frame;

an engine operably connected to the ground engaging members;

a first pump, operably connected to the engine, and in fluid communication via a first passage with a first valve that controls flow to an actuator controlling a boom operably mounted on the frame;

a second pump, operably connected to the engine, and in fluid communication via second passage with a second valve and a fourth valve, wherein the second valve controls flow to an actuator controlling an arm operably mounted on the boom, and the fourth valve controls flow to an actuator controlling an attachment operably mounted on the power machine;

a third valve, in fluid communication via an auxiliary passage with the first passage, downstream of the first valve, and with the second passage, downstream of the second valve and the fourth valve; and an apparatus for providing various flow options to the third valve, the apparatus being in fluid communication with the second passage downstream of the second valve and the fourth valve and upstream of the auxiliary passage.

9. The power machine of claim 8, wherein the apparatus for providing various flow options to the third valve comprises a dump valve that provides options for varying flow rate to the third valve.

10. The power machine of claim 9, wherein the apparatus for providing various flow options to the third valve further comprises a tank in fluid communication with the dump valve.

11. The power machine of claim 9, wherein the apparatus for providing various flow options to the third valve further comprises a supplemental pump that provides options for varying flow rate to the third valve.

12. The power machine of claim 11, wherein the apparatus for providing various flow options to the third valve further comprises a check valve.

13. The power machine of claim 9, wherein the apparatus for providing various flow options to the third valve further comprises a relief valve that provides options for varying fluid pressure provided to the third valve.

14. The power machine of claim 8, wherein the apparatus for providing various flow options to the third valve comprises a relief valve that provides options for varying fluid pressure provided to the third valve.

* * * * *